(12) United States Patent
Ko et al.

(10) Patent No.: US 9,904,664 B2
(45) Date of Patent: Feb. 27, 2018

(54) APPARATUS AND METHOD PROVIDING AUGMENTED REALITY CONTENTS BASED ON WEB INFORMATION STRUCTURE

(71) Applicant: KOREA INSTITUTE OF SCIENCE AND TECHNOLOGY, Seoul (KR)

(72) Inventors: Heedong Ko, Seoul (KR); Sang-chul Ahn, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 729 days.

(21) Appl. No.: 14/139,133

(22) Filed: Dec. 23, 2013

(65) Prior Publication Data

US 2014/0289607 A1    Sep. 25, 2014

(30) Foreign Application Priority Data

Mar. 21, 2013    (KR) .................. 10-2013-0030336

(51) Int. Cl.
*G06F 17/00* (2006.01)
*G06F 17/22* (2006.01)
*G06F 17/30* (2006.01)

(52) U.S. Cl.
CPC .... *G06F 17/2247* (2013.01); *G06F 17/30873* (2013.01)

(58) Field of Classification Search
CPC . G06F 17/22; G06F 17/30873; G06F 17/2247
See application file for complete search history.

(56) References Cited

U.S. PATENT DOCUMENTS

2007/0208713 A1*  9/2007  Krishnaprasad .. G06F 17/30286
2010/0257252 A1   10/2010  Dougherty et al.
(Continued)

FOREIGN PATENT DOCUMENTS

KR    10-2003-0054874    7/2003
KR    10-2009-0070900    7/2009
(Continued)

OTHER PUBLICATIONS

Fraser, "CSS trasnforms", npl, pp. 1-51, dated: Sep. 11, 2012, url:<http://www.w3.org/TR/2012/WDcss3transforms20120911/>.*
(Continued)

*Primary Examiner* — Mustafa A Amin
(74) *Attorney, Agent, or Firm* — NSIP Law

(57) ABSTRACT

There are provided an augmented reality contents providing apparatus based on a Web information structure including: an HTML document that includes a URI setting unit setting a uniform resource identifier (URI) corresponding to a point of interest (POI), a POI processing unit collecting attribute information from a target terminal and identifying the POI by using the collected attribute information, a virtual object processing unit that matches a virtual object associated with the URI to the identified POI; and a 3D browser engine used for setting coordinates on the 3D physical space such that the POI and the virtual object are displayed in a 3D virtual space through a Web browser of the target terminal, analyzing video information of the POI and the virtual object based on the set coordinates, and providing the target terminal the analyzed video information.

17 Claims, 8 Drawing Sheets

(56) References Cited

U.S. PATENT DOCUMENTS

| | | | |
|---|---|---|---|
| 2010/0277504 A1* | 11/2010 | Song | G06T 17/05 345/633 |
| 2011/0141141 A1* | 6/2011 | Kankainen | G01C 21/3647 345/632 |
| 2012/0190346 A1* | 7/2012 | Kim | G06T 19/006 455/414.1 |
| 2012/0209826 A1* | 8/2012 | Belimpasakis | G06F 17/3087 707/710 |
| 2012/0212405 A1* | 8/2012 | Newhouse | G02B 27/017 345/156 |
| 2013/0073988 A1* | 3/2013 | Groten | G06Q 30/02 715/753 |
| 2013/0086077 A1* | 4/2013 | Piippo | G06Q 30/0259 707/748 |
| 2013/0088514 A1* | 4/2013 | Breuss-Schneeweis | G06T 19/006 345/633 |
| 2013/0295952 A1* | 11/2013 | Chao | G01S 5/0236 455/456.1 |
| 2014/0128093 A1* | 5/2014 | Das | H04W 64/006 455/456.1 |

FOREIGN PATENT DOCUMENTS

| | | |
|---|---|---|
| KR | 10-2001-0114033 A | 12/2011 |
| KR | 10-2011-0136018 A | 12/2011 |
| KR | 10-2012-0009949 | 2/2012 |
| KR | 10-2012-0129982 A | 11/2012 |

OTHER PUBLICATIONS

Coyier, "Data URIs", npl, pp. 1-21, dated: Mar. 25, 2010, URL:<https://css-tricks.com/data-uris>.*

European Extended Search Report dated May 15, 2014 in counterpart European Patent Application No. 13199437.8 (5 pages, in English).

* cited by examiner

APPARATUS AND METHOD PROVIDING AUGMENTED REALITY CONTENTS BASED ON WEB INFORMATION STRUCTURE

CROSS-REFERENCE TO RELATED APPLICATION

This application claims priority to Korean Patent Application No. 10-2013-0030336, filed on Mar. 21, 2013, and all the benefits accruing therefrom under 35 U.S.C. § 119, the contents of which in its entirety are herein incorporated by reference.

BACKGROUND

1. Field

The present disclosure relates to an apparatus and a method providing augmented reality contents, and more particularly, to an apparatus and a method providing augmented reality contents based on a Web information structure using an HTML document including a program code for representing a 3D POI and a virtual object and a 3D browser engine.

2. Description of the Related Art

An augmented reality (AR) technology is a technology for superimposing a virtual object created by computer graphics on a real world in which a user is present and providing the user the result thereof.

Conventionally, authoring of AR reality contents through the AR technology is performed using a method in which a content created by a 3D modeling tool is loaded into an authoring system, and the position, the direction, the size of the loaded content to be augmented, an animation, and the like are created. However, the real world changes in real time, and there are a great number of physical objects (different from virtual objects displayed on a display as points of interest (POIs)). Accordingly, there is a problem in that much time and cost is required for incorporating the physical objects of the real world into a database for creating AR contents and updating the database.

In current AR applications, such a model is placed on an earth coordinate system, which is shared in an implied manner, at positional coordinates of latitude and longitude, or a tracking target image assumed as an "object of interest" in an implied manner is applied for an application. Accordingly, it is difficult to share or reuse them, and thus, there is a problem in that the level of difficulty of the development is high, and the efficiency is low. Therefore, there is a request for a method capable of sharing physical objects of the real world and identifying an object of interest or a position in contents using a simple identifier (ID).

In addition, a conventional HTML document lays out and visualizes contents included therein on a plane, which is a page, thereby representing the real world represented in 3D. For this, while a content is defined, generally, using coordinates of latitude and longitude in a physical space with earth ellipsoid WGS84 used as the reference, there are practical problems such as no presence of a positioning apparatus and a lack of direct recognizable representation value for applying this position model to an indoor environment.

SUMMARY

The present disclosure is directed to providing an apparatus and a method for providing augmented reality contents based on a Web information structure capable of matching a virtual object to a 3D real world on a Web document in a case where a point of interest is associated with one uniform resource identifier.

In one aspect, there is provided an augmented reality contents providing apparatus based on a Web information structure including: an HTML document that includes a URI setting unit setting a uniform resource identifier (URI) corresponding to a point of interest (POI) in a 3D physical space, a POI processing unit collecting attribute information from a target terminal and identifying the POI by using the collected attribute information, a virtual object processing unit that matches a virtual object associated with the URI to the identified POI; and a 3D browser engine 200 used for setting coordinates on the 3D physical space such that the POI and the virtual object are displayed in a 3D virtual space through a Web browser of the target terminal, analyzing video information of the POI and the virtual object based on the set coordinates, and providing the target terminal the analyzed video information.

In addition, the virtual object may include at least one of a text, an image, a moving image, and an animation to be displayed on the target terminal together with the POI.

In addition, the POI processing unit may include a first application code that identifies the POI by using at least one of GPS information, inertial sensor information, visual sensor information, and RFID tag information as the attribute information.

In addition, the virtual object processing unit may perform matching such that the virtual object is located to overlap the identified POI.

In addition, the virtual object processing unit may include a second application code that applies at least one of rotation, scaling, and inclination to the virtual object with a location of the POI set as a reference so as to be located on the POI.

In addition, the second application code may locate the virtual object on the POI by using a style sheet representing a 3D space.

In addition, an event managing unit that manages a touch event for the virtual object may be further included, wherein the virtual object processing unit may execute a touched virtual object in response to the touch event for the virtual object.

In addition, the virtual object may be a moving image or music information.

In addition, the above-described apparatus may further included an event managing unit that manages at least one of a touch event, a tracker event, a place event, and a POI event.

In addition, the above-described apparatus may further include the target terminal, wherein the target terminal may read the HTML document by using a Web browser.

In addition, the target terminal may include a camera and a display, wherein the POI and a peripheral environment of the POI may be photographed by the camera, and the display may match the virtual object to the photographed POI so as to be displayed through the Web browser.

In another aspect, there is provided a method of providing augmented reality contents based on a Web information structure, the method including: generating an HTML document that includes an URI setting unit setting a uniform resource identifier (URI) corresponding to a point of interest (POI) in a 3D physical space, a POI processing unit collecting attribute information from a target terminal and identifying the POI using the collected attribute information, and a virtual object processing unit matching a virtual object associated with the URI to the identified POI; and setting coordinates on the 3D physical space such that the POI and the virtual object are displayed in a 3D virtual space through a Web browser of the target terminal, analyzing video information of the POI and the virtual object based on the set coordinates, and providing the target terminal analyzed video information.

In addition, the virtual object may include at least one of a text, an image, a moving image, and an animation to be displayed on the target terminal together with the POI.

In addition, the POI processing unit may identify the POI by using at least one of GPS information, inertial sensor information, visual sensor information, and RFID tag information as the attribute information.

In addition, the virtual object processing unit may apply at least one of rotation, scaling, and inclination to the virtual object with a location of the POI set as a reference.

In addition, the HTML document may further include an event managing unit that manages a touch event for the virtual object, wherein the virtual object processing unit may execute a touched virtual object in response to the touch event for the virtual object, and the virtual object is a moving image or music information.

In addition, the HTML document may further include an event managing unit that manages at least one of a touch event, a tracker event, a place event, and a POI event.

According to an aspect of the present disclosure, in order to overcome the complexity of contents authoring and the inefficiency of modeling, a content structure is redesigned based on an information structure of the World Wide Web using a POI in a 3D space as a Web resource in accordance with requirements of augmented reality contents, and an existing Web contents structure is extended, whereby the complexity of authoring augmented reality contents and the reproducibility thereof may be enhanced.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Figure 1:
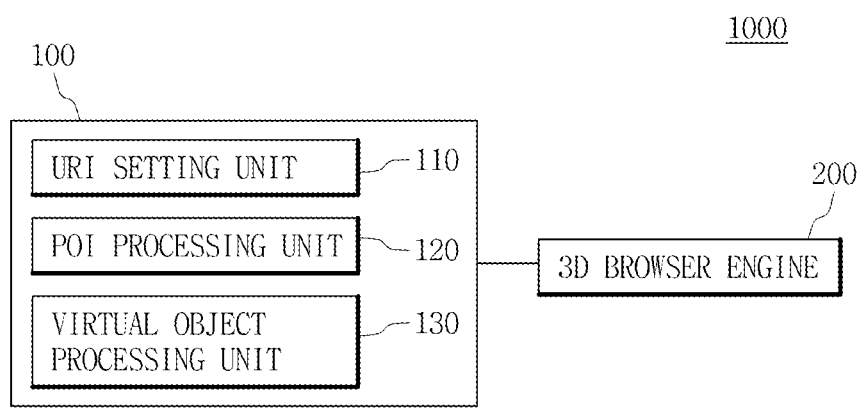
FIG. 1 is a configuration diagram of an AR contents providing apparatus based on a Web information structure according to an embodiment of the present disclosure.

The terminology used herein is for the purpose of describing particular embodiments only and is not intended to be limiting of the present disclosure. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. In the drawings, like reference numerals denote like elements. The shape, size and regions, and the like, of the drawing may be exaggerated for clarity.

An embodiment described here may have an aspect that is implemented entirely by hardware, partially by hardware and partially by software, or entirely by software. In description here, a "unit", a "module", an "apparatus", a "system", or the like denotes a computer-related entity that is implemented by hardware, a combination of hardware and software, software, or the like. For example, in the description here, a unit, a module, an apparatus, a system, or the like may be a process that is in the middle of execution, a processor, an object, an executable file, a thread of execution, a program, and/or a computer, but is not thereto. For example, both an application that is executed in a computer and the computer may correspond to a unit, a module, an apparatus, a system, or the like described here.

Embodiments have been described with reference to a flowchart illustrated in the drawings. While the method is illustrated and described as a series of blocks for the simplification of the description, the present disclosure is not limited to the order of the blocks. Thus, some blocks may be performed in an order different from that described and illustrated here or simultaneously, and various other branching, flow paths, and orders of blocks achieving the same result or a result similar thereto may be implemented. In addition, not all the illustrated blocks may not be required for realizing the method described here. Furthermore, a method according to an embodiment of the present disclosure may be realized in the form of a computer program for executing a series of procedures, and the computer program may be recorded on a computer-readable recording medium.

Hereinafter, embodiments of the present disclosure will be described in detail with reference to the drawings.

FIG. 1 is a configuration diagram of an AR contents providing apparatus based on a Web information structure according to an embodiment of the present disclosure. The AR contents providing apparatus 1000 according to the embodiment includes: an hyper-text markup language (HTML) document 100 including an URI setting unit 110 that sets a uniform resource identifier (URI) corresponding to a point of interest (POI) (here, the POI may include a physical object or a location as a physical object) that is a physical object present in a 3D physical space, a POI processing unit 120 that collects attribute information from a target terminal and identifies the POI by using the collected attribute information, and a virtual object processing unit 130 that matches a virtual object associated with the URI to an identified POI; and a 3D browser engine 200 used for setting coordinates on the 3D physical space such that the POI and the virtual object are displayed in the 3D virtual space through a Web browser of the target terminal, analyzing video information of the POI and the virtual object based on the set coordinates, and providing the target terminal the analyzed video information.

The AR contents providing apparatus 1000 based on a Web information structure according to an embodiment of the present disclosure may be a mechanical apparatus capable of generating an HTML document. In an embodiment, the above-described HTML document may be an electronic document written in HTML5. The AR contents providing apparatus 1000 based on a Web information structure may generate a program code in accordance with a user's operation or command and may be an arbitrary terminal or server that may transmit and receive various kinds of data through a communication network. For example, the AR contents providing apparatus 1000 may be any one of a personal computer, a laptop computer, a tablet personal computer, a smartphone, a personal digital assistant (PDA), a smart TV, and a mobile communication terminal, but is not limited thereto. The communication method includes all the communication methods in which an object may be networked with another object and is not limited to wired communication/wireless communication, 3G, 4G, or any other method.

In an embodiment, a URI 110 included in the HTML document 100 corresponds to a specific POI in the 3D physical space. The POI is a physical object (including an object and a location) of the real world.

Figure 2:
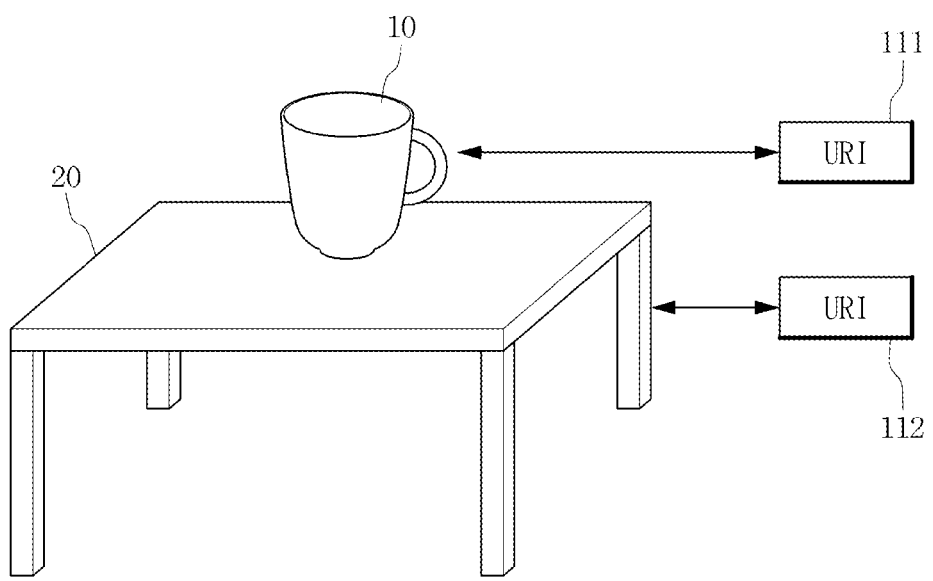
FIG. 2 is a diagram that illustrates the relation between a POI and an URI according to an embodiment of the present disclosure.

FIG. 2 is a diagram that illustrates the relation between a POI and an URI according to an embodiment of the present disclosure. Referring to FIG. 2, a cup 10 that is a physical object is located on a table 20. According to an embodiment of the present disclosure, URIs 111, 112 may be designated to the cup 10 and the table 20 in accordance with a user's input or command.

For example, a unique URI (URL) of "http://smart.imrc.kr/cup" 111 may be assigned as an URI corresponding to the cup 10, and "http://smart.imrc.kr/table" 112 may be assigned as a unique URI of the table 20. For example, in order to identify the cup 10, the original author may use a marker type or a marker-less type. The unique URI 111 may be assigned to the cup 10 identified employing such a type. Accordingly, the original author or another author may perform authoring of the AR content of the cup 10 by using the URI 111.

Figure 3:
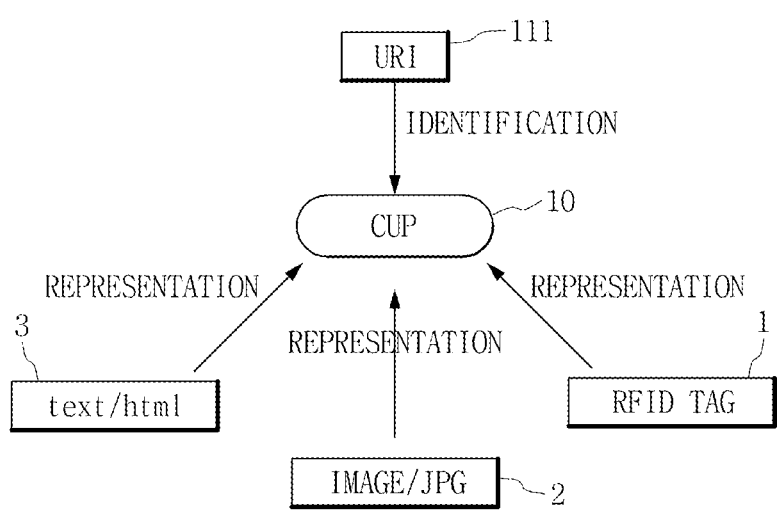
FIG. 3 is a diagram that illustrates the relation between a POI and an URI according to another embodiment of the present disclosure.

FIG. 3 is a diagram that illustrates the relation between a POI and an URI according to another embodiment of the present disclosure. Referring to FIG. 3, the cup 10 is represented by using an RFID tag 1 attached to the cup 10 illustrated in FIG. 2, an image 2 (including 2D and 3D images) acquired by photographing the cup 10, and another URL 3 to which another image file acquired by photographing the cup 10 is linked, whereby a POI that is a physical object may be identified by using one URI (for example, http://smart.imrc.kr/cup). Specifically, among the above-described methods, as a method for performing image processing, a POI may be identified from a photographed image by extracting feature points of the photographed image.

In order to identify a POI such as the cup 10, image processing for a photographed POI image is used, an RFID tag attached to the POI is used, a GPS module and an acceleration sensor are used in a case where the POI is present at a fixed location (for example, a building or a road), or a URI (URL) included in another HTML document may be included. Accordingly, even one physical object may be connected to one URI through a plurality of paths.

Conventionally, as in a method in which, when an HTML document inserts an image stored in an external storage space or the like into the content thereof in a Web structure, a URI of the image is referred to through a hyperlink, and this is dereferenced when the HTML document is displayed on the screen, also for an object that cannot be represented in a conventional Web and an HTML, the URI setting unit 110 according to the present disclosure identifies a POI and assigns a URI thereto by using such a method and receives metadata including a physical feature descriptor, thereby moving a physical object of the real world to a Web area and using the physical object.

The URI setting unit 110 may set an URI corresponding to the POI that has been identified using the above-described method and, accordingly, a unique URI corresponding to a specific POI may be set. In other words, a POI has an URI corresponding thereto so as to be handled as a Web resource, and, by acquiring meta data of the URI though the HTTP, the POI that is a physical object may be conveniently used in a Web page or the like through the URI like a music file and a moving image file that are electronic media.

The HTML document 100 of the AR contents providing apparatus 1000 based on a Web information structure may include a POI processing unit 120 and a virtual object processing unit 130. For example, the POI processing unit and the virtual object processing unit 120, 130 may be configured by program codes and be executed. In addition, in another embodiment, the POI processing unit and the virtual object processing unit may be arbitrary modules such as processors formed to perform the following function through the HTML document.

In an embodiment, the AR contents providing apparatus 1000 based on a Web information structure may include a program (for example, a developer tool) that may generate such codes, a memory used for storing a protocol, a microprocessor used for performing calculation and control by executing a corresponding application, and a transmission unit that may transmit the HTML document as a target terminal, and may be a cloud computing terminal supporting cloud computing capable of generating the HTML document 100 through a communication network.

Figure 4:
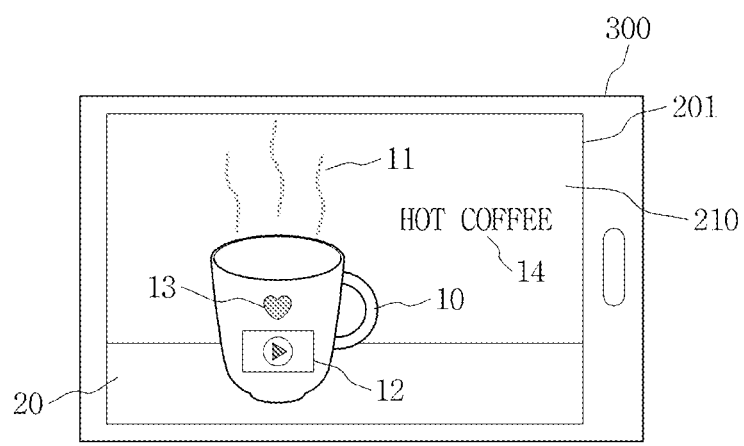
FIG. 4 is a diagram that illustrates a target terminal, in which virtual objects and POIs are represented, according to an embodiment of the present disclosure.

FIG. 4 is a diagram that illustrates a target terminal 300, in which virtual objects and POIs are represented, according to an embodiment of the present disclosure. The target terminal 300 is a user terminal that is a target for reading the HTML document 100 and executing commands of the HTML document. The target terminal 300 may be an arbitrary terminal that may transmit and receive various kinds of data through a communication network and, for example, may be any one of a tablet PC, a laptop computer, a personal computer, a smartphone, a PDA, a mobile communication terminal, but is not limited thereto.

The target terminal 300 may include an interpreter that reads the HTML document 100. For example, the target terminal 300 may read the HTML document 100 using a Web browser driven by the target terminal 300 and execute commands of the codes by using a Java script interpreter mounted in the Web browser.

The POI processing unit 120 included in the HTML document 100 may collect attribute information from the target terminal and identify the POI by using the collected attribute information.

Specifically, the POI processing unit 120 may include a first application code 121 for identifying the POI using at least one of GPS information, inertial sensor information, visual sensor information, and RFID tag information as the attribute information.

In other words, the attribute information may include image information, RFID tag information, geographic information acquired by the GPS and the accelerator sensor, and the like as information identifying (sensing) the POI using the target terminal 300. The above-described attribute information includes the URI 110 and information defining the POI corresponding to the URI 110.

For example, in a case where a URI of the building is set using an RFID tag attached to the entrance of a specific building, the RFID tag is the attribute information. Accordingly, the POI processing unit 120 may identify the above-described building using the RFID tag and search an URI corresponding thereto through the HTML.

Then, in order to set coordinates on a 3D physical space and identify (tag) a POI based on the set coordinates, the POI processing unit 120 may use a medium type (for example, a place media) acquired by expanding a 3D space to an existing CSS medium type.

In a case where a POI is photographed, and the POI represented as image information corresponds to the URI, in order to acquire image information of the POI for identifying the POI and using the URI corresponding thereto, the target terminal 300 includes an image-related sensor such as a camera. Similarly, in a case where the POI represented as geographic information corresponds to a specific URI, a module such as a GPS for acquiring the geographic information may be required in the target terminal.

Referring to FIG. 4, virtual objects 11 to 14 that match the POI 10 in the 3D space appear through a display 201 of the target terminal 300.

As illustrated in FIG. 4, the virtual object processing unit 130 included in the HTML document 100 may match virtual objects to the identified POI in the 3D space. Here, the visual object relates to a URI corresponding to the identified POI and is information configured to be associated with the URI on the HTML document.

The virtual object processing unit 130 may perform matching such that the virtual objects are located to overlap the identified POI in the target terminal.

As illustrated in FIG. 4, an animation 11 representing hot air so as to represent that a hot liquid is contained in the cup 10, a moving image 12, an arbitrary image 13, a text 14 (HOT COFFEE), and the like may be displayed as virtual objects through the display 201 of the target terminal 300. Information of the virtual objects as above may be configured on an HTML document based on the URI corresponding to the POI.

In another embodiment, the virtual object processing unit 130 may include a second application code 131, and, in a case where the above-described virtual objects are located, the second application code 131 may locate the virtual objects by rotating, scaling, or inclining each virtual object with the location of the POI set as the origin point. In such a case, the 3D browser engine 200 may maintain the matching between the virtual objects and the POI to be smooth by appropriately adjusting the locations and the states of the virtual objects on a 3D image in accordance with the posture and the location of the target terminal.

The 3D browser engine 200 according to an aspect of the present disclosure may define, particularly, meaningful areas present indoors and outdoors as "places" and define a specification that models specific information thereof. Each place may have 2D and 3D coordinate systems that are individually defined, and virtual objects may be situated with the coordinate system of a place corresponding to a user's location set as the reference.

For this, for an application to a Web information structure, the 3D browser engine 200 may define a place medium that is a new medium type in compliance with the media type specification of the CSS. The above-described extended CSS medium type including the place medium is a specification extended such that an HTML document is not limited to an existing page of an audio, braille, and the like on a screen but is extended so as to be rendered to various forms of media such as a place in the 3D physical space in which the POI is present.

In other words, the POI processing unit and the 3D browser engine of the AR contents providing apparatus based on a Web information structure according to the present disclosure may define a 3D coordinate system for the "place of the physical world" in which a user is present by using the CSS medium type extended as above and may define a model in which the user, virtual objects, and physical objects are arranged together (coexist) based on this coordinate system.

Accordingly, the 3D browser engine 200 may set coordinates on a 3D physical space such that the POI and the virtual objects are displayed in a 3D virtual space through a Web browser, analyze the video information of the POI and the virtual objects based on the set coordinates, and provide the analyzed video information to the target terminal.

The target terminal 300 may render the video information and display the POI and the virtual objects in the 3D virtual space through a Web browser.

Since the POI is located in the 3D space, and the target terminal 300 providing the virtual objects is present in the 3D space as well, the 3D browser engine 200 may analyze the motions of the POI and the virtual objects in the 3D space and provide the analyzed information to the target terminal 300 so as to enable a user to view it. For example, the 3D browser engine 200 may be implemented by any one of various 3D engines such as a WebGL and a CSS 3D transform. In addition, in another embodiment, the 3D browser engine 200 may be implemented to be included in the HTML document 100.

Figure 5:
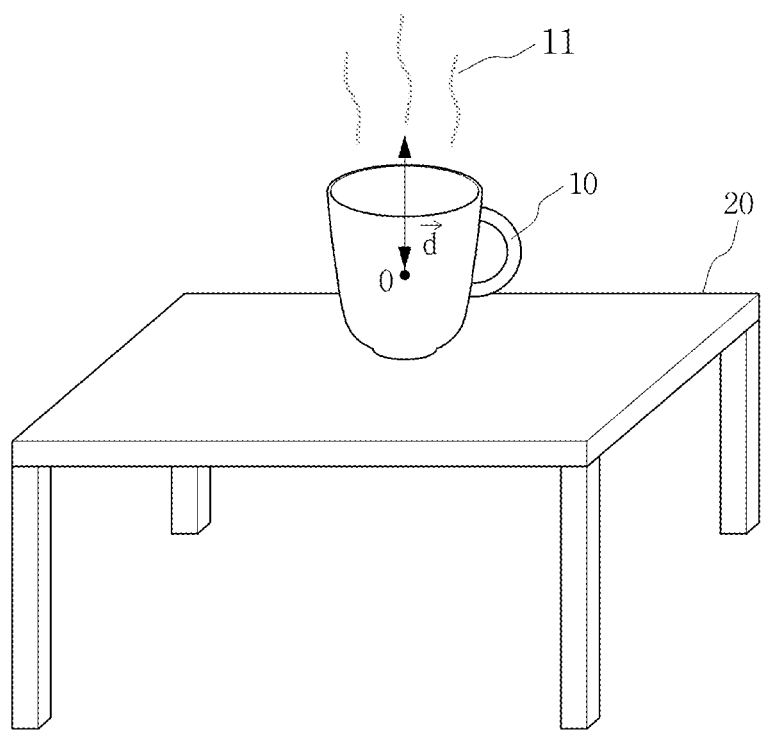
FIG. 5 is a diagram that illustrates a method of setting the positions of a POI and a virtual object using a virtual object processing unit according to an embodiment of the present disclosure.

FIG. 5 is a diagram that illustrates a method of setting the positions of a POI and virtual objects using the virtual object processing unit 130 according to an embodiment of the present disclosure. The virtual object processing unit 130 may perform a specific visual effect function for virtual objects. Referring to FIG. 5, in order to locate a virtual object 11 relating to the cup 10 above the cup, the virtual object processing unit 130 may designate a location separated from a center position of the cup 10 identified by the POI processing unit by a vector d.

Conventionally, although a virtual object may be arranged to be located in a "fixed space" by representing only using coordinate values with a fixed single origin (the center of the earth), the virtual object processing unit 130 according to the present disclosure may extensively define a location as one of the CSS properties (for example, ar-target) by supporting the concept of "places" in which the reference point may be changed as desired, enabling also a dynamically moving object to be relatively arranged, and augmenting virtual objects using CSS for assuring the compatibility with the CSS responsible of the arrangement of elements in an existing HTML.

In an embodiment, since a virtual object matches a POI in the actual 3D space that is recognized by a camera of the target terminal 300, the second application code 131 may use a style sheet representing the 3D space. The style sheet representing a 3D space may be provided as an CSS extended module used for representing the 3D space. For example, in order to locate a virtual object on a target POI, the second application code 131 may have AR cascading style sheets (CSS) properties and property methods as illustrated in the following Table 1.

TABLE 1

AR CSS PROPERTY

| -at- target | select a virtual object with position of target POI set as original point |
| -ar- transform | apply 3D transformation for selected virtual object -ar- transform PROPERTY METHOD |
| Translate( ) | define 3D straight movement |
| Rotate( ) | define 3D rotation |
| Scale( ) | define 3D scaling |
| Matrix3D( ) | define 3D transformation as 4 × 4 matrix |

TABLE 2

EXAMPLE OF CSS TRANSFORMATION

```
<html>
    <style type="text/css" media="place">
      #container {
        -ar-target: object("http://smart.imrc.kr/hci2013/rest/poi/22");
      }
      #image {
        -Webkit-transform: translate3d(300px, 100px, 100px)
                           rotate3d(1, 2, 0, 30deg)
                           scale(1.3);
      }
    </style>
    <body>
      <div id="container">
        <img id="image" src="image.png" />
      </div>
    </body>
</html>
```

Figure 6:
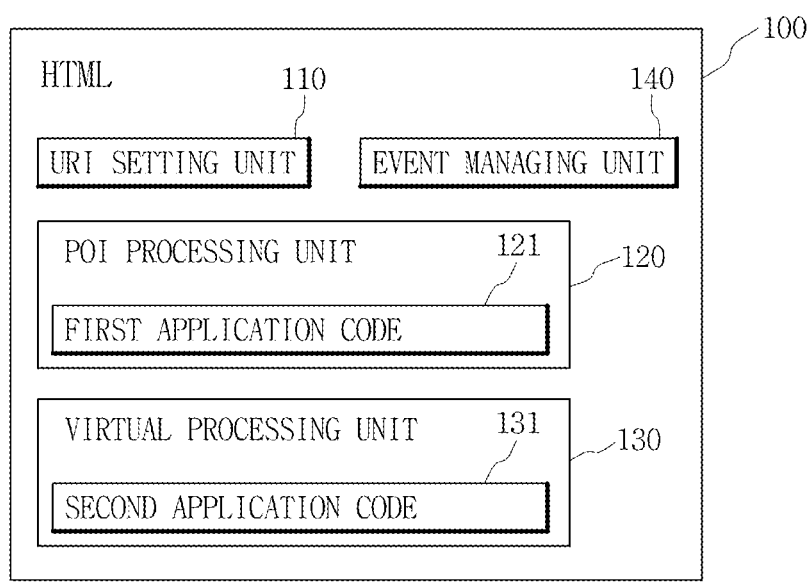
FIG. 6 is a diagram that illustrates the configuration of an HTML document according to another embodiment of the present disclosure.

FIG. 6 is a diagram that illustrates the configuration of an HTML document 100 according to another embodiment of the present disclosure. In an embodiment, in addition to the configuration illustrated in FIG. 1, the HTML document 100 may further include an event managing unit 140 and first and second application codes 121, 131. The event managing unit 140 and the first and second application codes 121, 131 may be included together in the HTML document 100 and may be included in another embodiment. In addition, in another embodiment, the event managing unit 140 may be implemented to be included in the HTML document 100.

A DOM event type defines the types of user inputs and analysis methods thereof in a conventional Web. In the DOM event type, only the process for an input made through a mouse, a keyboard, and the like is defined, and, recently, a touch event and the like are in the process of standardization in accordance with an increase of the numbers of smartphones. However, in order to display an HTML document in a space and process a browsing event, an additional event type needs to be defined.

Accordingly, in a document object model (DOM) level 3, the event managing unit 140 according to an embodiment of the present disclosure may further include a touch event, a tracker event, a place event, and a POI event in addition to a focus event, a mouse event, a keyboard event, and a composition event. Here, the place event may include a location event and an orient event.

The touch event is an event of recognizing a touch for a virtual object. Referring to FIG. 4, the second application code 131 may recognize a touch input for the virtual object 12 that is a moving image and reproduce the moving image 12. As above, a virtual object may be prepared such that music is reproduced when the virtual object that is music is touched. Here, the touch event may be performed through a touch screen of the target terminal 300.

The place event represents a geographic change event of the target terminal 300 and the POI event represents an event of the state (for example, enlargement, reduction, or a change) of the POI recognized by the target terminal (displayed on the display of the target terminal) and a position movement event of the POI. The place event represents an event of changes in the place at which the target terminal is located and the direction toward which the target terminal 300 faces. The tracker event represents an event of tracking for matching a virtual object to the POI changing in the 3D space.

Accordingly, the AR contents providing apparatus 1000 based on a Web information structure according to the present disclosure may provide a user using the target terminal a further extended user interface (UI) by additionally including the event managing unit 140.

Figure 7:
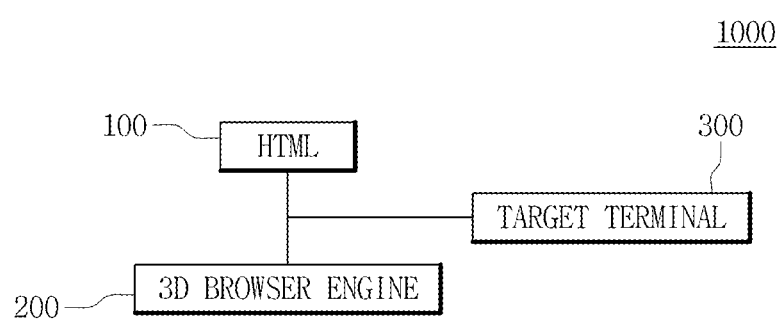
FIG. 7 is a configuration diagram of an AR contents providing apparatus based on a Web information structure according to another embodiment of the present disclosure.

FIG. 7 is a configuration diagram of an AR contents providing apparatus 1000 based on a Web information structure according to another embodiment of the present disclosure. Referring to FIG. 7, the AR contents providing apparatus 1000 based on a Web information structure may further include a target terminal 300 that reads the HTML document 100 using a Web browser.

The configuration of the target terminal 300 is as described above, and an AR service may be provided to a user through a Web browser 210 as illustrated in FIG. 4. For example, the target terminal 300 may include a camera (not illustrated in the figure) and the display 201. The camera photographs a POI and a peripheral environment thereof, and the display may display the virtual objects matched to the photographed POI through the Web browser 210.

Figure 8:
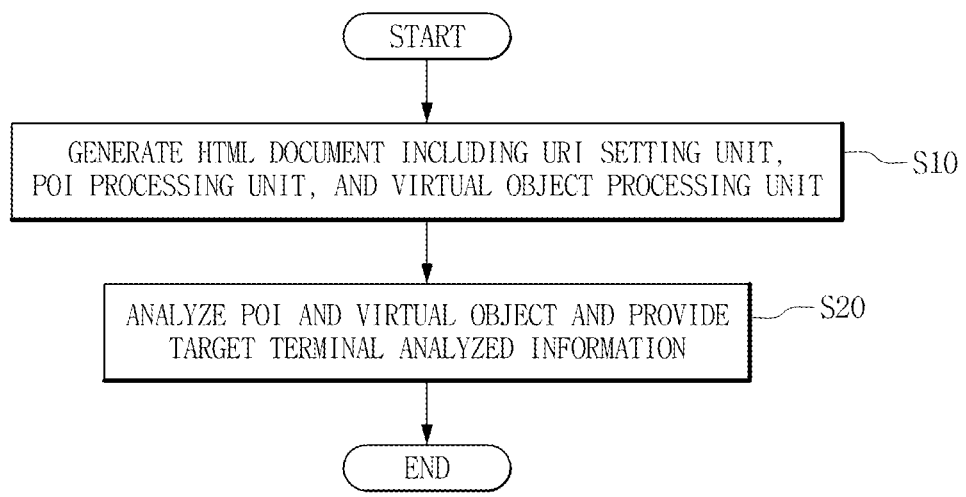
FIG. 8 is a flowchart of a method of providing AR contents based on a Web information structure according to an embodiment of the present disclosure.

FIG. 8 is a flowchart of a method of providing AR contents based on a Web information structure according to an embodiment of the present disclosure. The method of providing AR contents based on a Web information structure according to an embodiment of the present disclosure includes generating an HTML document that includes an URI setting unit setting an URI corresponding to a POI in a 3D physical space, a POI processing unit collecting attribute information from a target terminal and identifying the POI using the collected attribute information, and a virtual object processing unit matching virtual objects associated with the URI to the identified POI (S10) and setting coordinates on the 3D physical space such that the POI and the virtual objects are displayed in a 3D virtual space through a Web browser of the target terminal, analyzing video information of the POI and the virtual objects based on the set coordinates, and providing the target terminal the analyzed video information (S20).

In the generating of an HTML document including the URI setting unit, the POI processing unit, and the virtual object processing unit (S10), the HTML document may be generated in HTML5. In addition, the virtual object may include at least one of a text, an image, a moving image, and an animation to be displayed on the target terminal together with the POI.

Then, the POI processing unit 120 may identify the POI by using at least one of GPS information, inertial sensor information, visual sensor information, and RFID tag information as the attribute information, and the virtual object processing unit may apply at least one of rotation, scaling, and inclination to the virtual object with the location of the POI set as the reference.

In another embodiment, the HTML document may include an event managing unit that manages various events occurring in the target terminal, and the event managing unit may manage at least one of a touch event, a tracker event, a place event, a POI event.

The functions of specific configurations of the method of providing AR contents based on a Web information structure may be described by referring to the description of the AR contents providing apparatus 1000 based on a Web information structure described above.

As above, a POI that is a physical object may be handled as one of Web resources through the HTML document, and the production of contents and applications using AR on the Web may be simplified, and the service thereof may be easily performed.

While the exemplary embodiments have been shown and described, it will be understood by those skilled in the art that various changes in form and details may be made thereto without departing from the spirit and scope of the present disclosure as defined by the appended claims. In addition, many modifications can be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

What is claimed is:
1. A method of providing augmented reality contents based on a Web information structure, the method comprising:
generating a Hypertext Markup Language (HTML) document that includes an URI setter element configured to set a uniform resource identifier (URI) corresponding to a point of interest (POI) in a three-dimensional (3D) physical space, and a virtual object processor element configured to match a virtual object associated with the URI to the POI;
collecting attribute information from a target terminal and identifying the POI using the collected attribute information;
setting coordinates on the 3D physical space such that the POI and the virtual object are displayed in a 3D virtual space through the target terminal;
analyzing video information of the POI and the virtual object based on the set coordinates; and
providing analyzed video information to the target terminal,
wherein the URI setter element and the virtual object processor element are defined as Cascading Style Sheets (CSS) in the HTML document.
2. The method according to claim 1, wherein the virtual object comprises at least one of a text, an image, a moving image, and an animation to be displayed on the target terminal together with the POI.
3. The method according to claim 1, wherein a POI processor element is configured to identify the POI by using at least one of Global Positioning System (GPS) information, inertial sensor information, visual sensor information, and Radio Frequency Identification (RFID) tag information as the attribute information.
4. The method according to claim 1, wherein the virtual object processor element is configured to apply at least one of rotation, scaling, and inclination to the virtual object with a location of the POI set as a reference.
5. The method according to claim 1,
wherein the HTML document further comprises an event managing unit configured to manage a touch event for the virtual object,
wherein the virtual object processor element is configured to execute a touched virtual object in response to the touch event for the virtual object, and
wherein the virtual object comprises a moving image or music information.
6. The method according to claim 1, wherein the HTML document further comprises an event manager element configured to manage at least one of a touch event, a tracker event, a place event, and a POI event.
7. An apparatus for providing augmented reality contents, the apparatus comprising:
a processor comprising:
a three-dimensional (3D) browser engine configured to render a Hypertext Markup Language (HTML) document comprising a URI setter element configured to set a uniform resource identifier (URI) corresponding to a point of interest (POI) in a 3D physical space, and a virtual object processor element configured to match a virtual object associated with the URI to the POI; and
a POI processor element configured to collect attribute information from a target terminal and to identify the POI by using the collected attribute information,
wherein the 3D browser engine is configured to set coordinates on the 3D physical space such that the POI and the virtual object are displayed in a 3D virtual space through the target terminal, analyze video information of the POI and the virtual object based on the set coordinates, and provide the analyzed video information to the target terminal,
wherein the URI setter element and the virtual object processor element are defined as Cascading Style Sheets (CSS) in HTML document.
8. The apparatus according to claim 1, wherein the virtual object comprises at least one of a text, an image, a moving image, and an animation to be displayed on the target terminal together with the POI.
9. The apparatus according to claim 1, wherein the POI processor element comprises a first application code that identifies the POI by using at least one of Global Positioning System (GPS) information, inertial sensor information, visual sensor information, and Radio Frequency Identification (RFID) tag information as the attribute information.
10. The apparatus according to claim 1, wherein the virtual object processor element is configured to match the virtual object such that the virtual object is located to overlap the identified POI.
11. The apparatus according to claim 10, wherein the virtual object processor element comprises a second application code that applies at least one of rotation, scaling, and inclination to the virtual object with a location of the POI set as a reference so as to be located on the POI.

12. The apparatus according to claim 11, wherein the second application code locates the virtual object on the POI by using a style sheet representing a 3D space.

13. The apparatus according to claim 1, wherein the processor further comprises an event manager configured to manage a touch event for the virtual object,
   wherein the virtual object processor element is further configured to execute a touched virtual object in response to the touch event for the virtual object.

14. The apparatus according to claim 13, wherein the virtual object comprises a moving image or music information.

15. The apparatus according to claim 1, further comprising an event manager configured to manage at least one of a touch event, a tracker event, a place event, and a POI event.

16. The augmented reality contents providing apparatus based on a Web information structure according to claim 1, further comprising the target terminal,
   wherein the target terminal is configured to read the HTML document by using a Web browser.

17. The apparatus according to claim 16,
   wherein the target terminal comprises a camera and a display,
   wherein the camera is configured to image the POI and a peripheral environment of the POI, and
   wherein the display is configured to match the virtual object to the photographed POI so as to be displayed through the Web browser.

* * * * *